United States Patent
Ohnuki et al.

(10) Patent No.: US 12,049,707 B2
(45) Date of Patent: Jul. 30, 2024

(54) CYLINDER DEVICE, METAL SLIDING COMPONENT, AND METHOD FOR PRODUCING METAL SLIDING COMPONENT

(71) Applicant: Hitachi Astemo, Ltd., Ibaraki (JP)

(72) Inventors: Takuma Ohnuki, Hitachinaka (JP); Hiroshi Nakano, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 401 days.

(21) Appl. No.: 17/621,416

(22) PCT Filed: Jun. 5, 2020

(86) PCT No.: PCT/JP2020/022244
§ 371 (c)(1),
(2) Date: Dec. 21, 2021

(87) PCT Pub. No.: WO2020/261930
PCT Pub. Date: Dec. 30, 2020

(65) Prior Publication Data
US 2022/0356590 A1    Nov. 10, 2022

(30) Foreign Application Priority Data

Jun. 26, 2019  (JP) .................. 2019-118685

(51) Int. Cl.
  *C25D 3/10*   (2006.01)
  *C25D 5/00*   (2006.01)
  *C25D 7/04*   (2006.01)
(52) U.S. Cl.
  CPC .............. *C25D 3/10* (2013.01); *C25D 5/617* (2020.08); *C25D 7/04* (2013.01)

(58) Field of Classification Search
  None
  See application file for complete search history.

(56) References Cited

U.S. PATENT DOCUMENTS 4,543,172 A * 9/1985 Suzuki ............... C25D 5/08
                                        204/224 R
4,828,656 A * 5/1989 Korbach ............ C25D 3/10
                                        420/428
(Continued)

FOREIGN PATENT DOCUMENTS

JP       52-15425 A    2/1977
JP       55138097 A   10/1980
(Continued)

OTHER PUBLICATIONS

International Search Report received in corresponding International Application No. PCT/JP2020/022244 mailed Sep. 1, 2020.
(Continued)

*Primary Examiner* — Louis J Rufo
(74) *Attorney, Agent, or Firm* — MATTINGLY & MALUR, PC

(57) ABSTRACT

This cylinder device includes a tubular cylinder that has an opening portion on at least one end side, a metal rod that protrudes through the opening portion of the cylinder, and a sliding contact member that is provided at the opening portion of the cylinder and comes into sliding contact with the rod. A chromium plating film is provided on a surface of the rod. An aspect ratio of an average crystallite diameter in a film thickness direction to an average crystallite diameter in an in-plane direction in the chromium plating film is 0.2 or smaller.

13 Claims, 9 Drawing Sheets

(56) References Cited

U.S. PATENT DOCUMENTS

| | | | | |
|---|---|---|---|---|
| 4,875,983 | A | * 10/1989 | Alota | C25D 9/08 |
| | | | | 205/108 |
| 6,329,071 | B1 | 12/2001 | Kobayashi et al. | |
| 2007/0227895 | A1* | 10/2007 | Bishop | C25D 3/10 |
| | | | | 205/287 |
| 2016/0228977 | A1 | 8/2016 | Shibata et al. | |

FOREIGN PATENT DOCUMENTS

| | | | |
|---|---|---|---|
| JP | 2005-213564 | A | 8/2005 |
| JP | 2006-307322 | A | 11/2006 |
| JP | 2006307322 | A * | 11/2006 |
| JP | 3918156 | B2 | 2/2007 |

OTHER PUBLICATIONS

Written Opinion received in corresponding International Application No. PCT/JP2020/022244 mailed Sep. 1, 2020.
Indian Office Action received in corresponding Indian Application No. 202117059525 dated Jul. 5, 2022.

* cited by examiner

AR=$h_0/a_0$

CYLINDER DEVICE, METAL SLIDING COMPONENT, AND METHOD FOR PRODUCING METAL SLIDING COMPONENT

TECHNICAL FIELD

The present invention relates to a cylinder device, a metal sliding component, and a method for producing a metal sliding component.

Priority is claimed on Japanese Patent Application No. 2019-118685, filed Jun. 26, 2019, the content of which is incorporated herein by reference.

BACKGROUND ART

Various technologies have been developed to improve sliding characteristics of metal sliding components such as piston rods.

For example, a technology for precipitating a chromium layer having no stress gradient in a thickness direction (refer to Patent Literature 1), a technology for improving a structure of a high-speed chromium plating device (refer to Patent Literature 2), and a technology for defining an average diameter of crystallites of a chromium plating film and defining a peak intensity ratio expressed by ({211}/{222}) (refer to Patent Literature 3) are known.

CITATION LIST

Patent Literature

[Patent Literature 1]
Japanese Patent No. 3918156
[Patent Literature 2]
Japanese Unexamined Patent Application, First Publication No. S55-138097
[Patent Literature 3]
Japanese Unexamined Patent Application, First Publication No. 2006-307322

SUMMARY OF INVENTION

Technical Problem

However, in the foregoing technologies in the related art, there is a problem in that sliding characteristics such as a frictional coefficient and a wear resistance of a plating film are insufficient. The technologies described in the foregoing Patent Literature are production technologies for making a practical plating film for each sliding component, and there is a need to make sliding components by trial and error in regard to sliding characteristics of surfaces of a plating film.

Incidentally, the inventor is proceeding with development of a technology for increasing a film formation speed of chromium plating on a piston rod for suspension.

In addition, investigation has been carried out such that characteristic values of an obtained plating film become equivalent to those of plated articles in the related art even if the film formation speed of chromium plating is increased.

However, when detailed analysis was performed regarding the crystallinity of a chromium plating film obtained through high-speed chromium plating, the inventor found that it had a crystallinity which could improve the sliding characteristics of a piston rod.

The present invention focuses on crystal structures formed on a surface of a chromium plating film during a production stage and provides a metal sliding component which has a chromium plating film with basic crystal structures affecting sliding characteristics, a cylinder device including the same, and a method for producing a metal sliding component.

Solution to Problem

According to a first aspect of the present invention, there is provided a cylinder device including a tubular cylinder that has an opening portion on at least one end side, a metal rod that protrudes through the opening portion of the cylinder, and a sliding contact member that is provided at the opening portion of the cylinder and comes into sliding contact with the rod. A chromium plating film is provided on a surface of the rod. An aspect ratio of an average crystallite diameter in a film thickness direction to an average crystallite diameter in an in-plane direction of crystallites in the chromium plating film is 0.2 or smaller.

Advantageous Effects of Invention

According to the foregoing cylinder device, there is an effect of being able to reduce the aspect ratio of crystal structures constituting a chromium plating film, and thus the frictional coefficient can be reduced. Moreover, hardness can also be improved. For this reason, it is possible to provide a cylinder device including a metal sliding component that has a chromium plating film with improved sliding characteristics. Since the aspect ratio is reduced to 0.2 or smaller, a true contact portion with respect to an opponent material is stable during sliding. In addition, the number of times of sliding at crystal grain boundaries which may generate fine differences in level can be reduced, and the frictional coefficient of the chromium plating film can be decreased.

In addition, according to the cylinder device including a rod serving as such a metal sliding component, it is possible to provide a cylinder device in which sliding characteristics of a rod can be improved and which has excellent durability.

DESCRIPTION OF EMBODIMENTS

Hereinafter, a rod serving as a metal sliding component according to an embodiment of the present invention will be described.

The following embodiments specifically describe the invention for better understanding of the gist thereof and do not limit the present invention unless otherwise specified.

Figure 1:
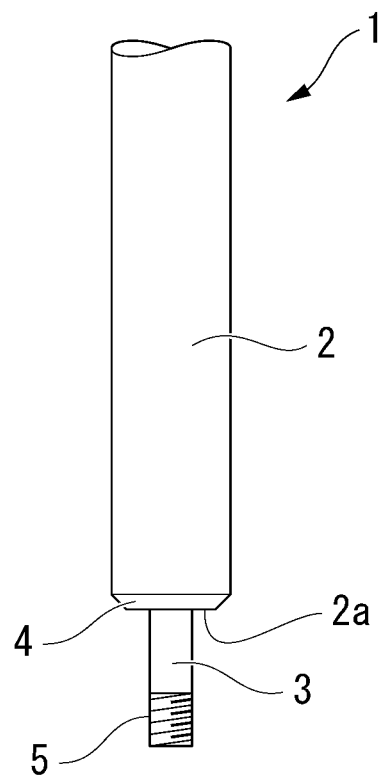
FIG. 1 is a side view illustrating a rod serving as a metal sliding component according to an embodiment of the present invention.

FIG. 1 is a side view illustrating a rod 1 as an example of the metal sliding component according to the embodiment of the present invention.

This rod 1 is constituted of a large diameter portion 2 which has a round bar shape and a small diameter portion 3 which is formed to extend from the large diameter portion 2 at the center of one end portion of this large diameter portion 2 in a length direction. A tapered surface 4 formed to be reduced in diameter is formed on one end side of the large diameter portion 2. The small diameter portion 3 is formed via a flange portion 2a formed on a terminal side of this tapered surface 4. A male screw portion 5 is formed on a tip side of the small diameter portion 3.

The rod 1 is a plated article which has been subjected to plating. An outer circumferential surface of the large diameter portion 2 and the tapered surface 4 are plated by electrodeposition.

Figure 2:
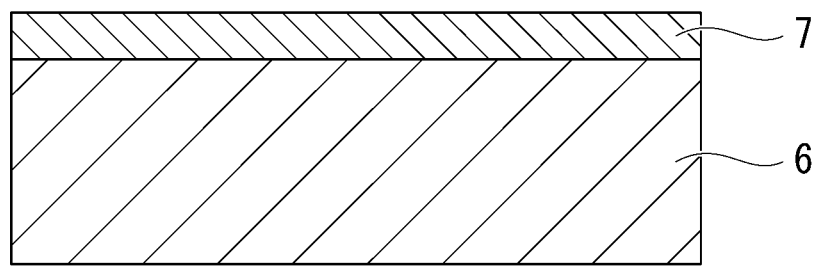
FIG. 2 is a partial cross-sectional view illustrating a chromium plating film formed on a surface part of the rod illustrated in FIG. 1.

FIG. 2 is a cross-sectional view of a portion cut out from a surface part of the large diameter portion 2. A surface of a metal base material 6 that is a steel base material constituting the large diameter portion 2 is coated with a chromium plating film 7. In the rod 1, both the large diameter portion 2 and the small diameter portion 3 are constituted of steel base materials.

In the chromium plating film 7 of the present embodiment, an aspect ratio of an average crystallite diameter in a film thickness direction to an average crystallite diameter in an in-plane direction is 0.2 or smaller. In the chromium plating film 7, crystals are oriented such that (111) planes of the crystals of chromium have a preferred azimuth aligned parallel to the in-plane direction. The crystallites described in the present embodiment indicate a region in which single crystals are gathered. The crystallite diameters can be obtained by, for example, X-ray diffraction method.

In the chromium plating film 7, the average diameter of the crystallites is formed to be 12 nm or smaller in the film thickness direction (FTD) and 60 nm or larger in the in-plane direction (PD). The average diameter of the crystallites is preferably 0.28 nm or larger in the film thickness direction and is preferably 240 nm or smaller in the in-plane direction.

Figure 3A:
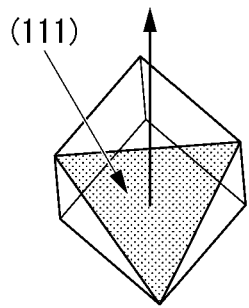
FIG. 3A is an explanatory view illustrating a unit lattice of a crystal and illustrates, as an example, an azimuth and an aspect ratio of crystallites of the chromium plating film illustrated in FIG. 2.
Figure 3B:
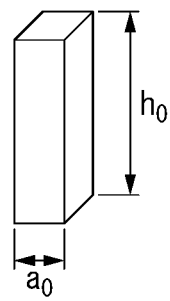
FIG. 3B is an explanatory view illustrating an aspect ratio of a crystal lattice and illustrates, as an example, an azimuth and an aspect ratio of crystallites of the chromium plating film illustrated in FIG. 2.

FIG. 3A is an explanatory view illustrating the (111) plane in a unit lattice of a chromium crystal having a bcc structure. FIG. 3B is an explanatory view illustrating a concept of the aspect ratio in a chromium crystal lattice.

When an axial length of a bcc unit lattice in a width direction is expressed as a0 and an axial length thereof in a height direction is expressed as h0, the aspect ratio (AR) of the chromium crystal lattice illustrated in FIG. 3B becomes a value expressed by h0/a0.

Figure 4:
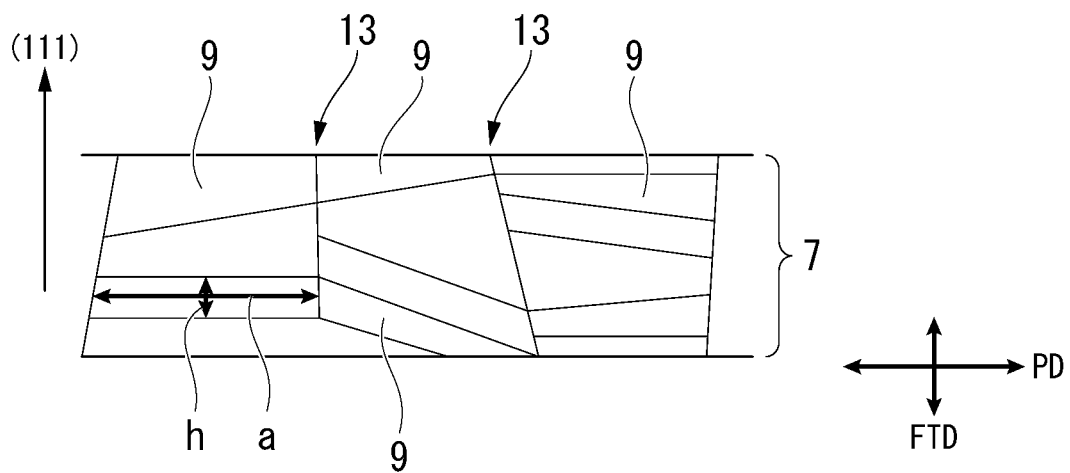
FIG. 4 is a conceptual diagram illustrating crystallites of the chromium plating film illustrated in FIG. 2.
Figure 5:
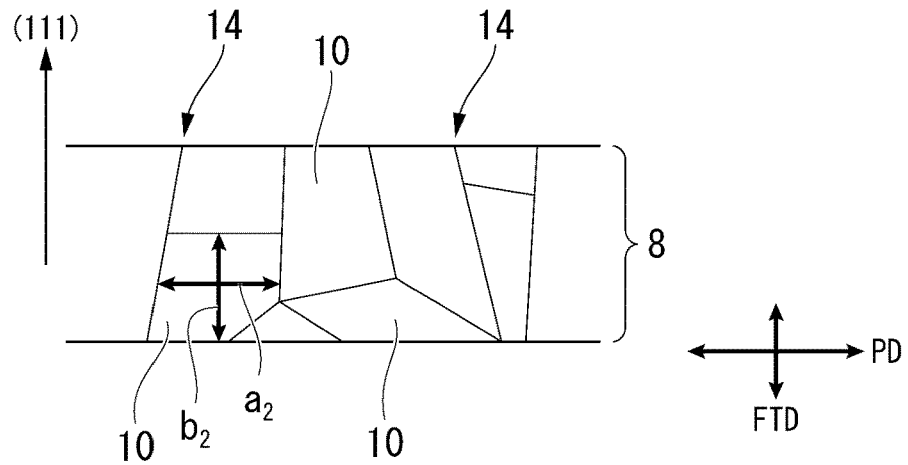
FIG. 5 is a conceptual diagram illustrating crystallites of a chromium plating film in the related art.

FIG. 4 is a conceptual diagram illustrating a schematic crystal structure of the chromium plating film 7 according to the present embodiment. FIG. 5 is a conceptual diagram illustrating a schematic crystal structure of a chromium plating film 8 having a structure in the related art. The azimuths of the deposited (111) planes are indicated by the arrows in FIGS. 4 and 5. In the chromium plating films 7 and 8, the (111) planes are preferentially orientated in the in-plane (film surface) direction.

The term "preferred azimuth" indicates a state of a polycrystalline aggregate, and the crystal azimuth has the meaning that crystals tend to be arranged in a particular direction instead of a random direction.

The crystallinity and the preferred azimuth can be analyzed from a diffraction pattern obtained through X-ray diffraction measurement, for example. In a representative X-ray diffraction pattern of the chromium plating film according to the present embodiment, strong (222) peaks indicating a preferred orientation of the (111) planes are observed. When an integrated intensity is obtained from such a pattern of peaks and an intensity ratio is calculated, (222) peaks of 90% or more are indicated. Since the intensity ratio of the (222) peaks is approximately 3% in standard data of non-orientated chromium, it can be said that they have a strong preferred orientation.

In the chromium plating film 7 of the present embodiment illustrated in FIG. 4, a region having continuously formed single crystals will be defined as crystallites 9. The aspect ratio of the crystallites 9 is indicated by h/a in FIG. 4, for example, and the aspect ratio of crystallites 10 having a structure in the related art illustrated in FIG. 5 is indicated by h2/a2 in FIG. 5.

In the chromium plating film 7 of the present embodiment illustrated in FIG. 4, the aspect ratio (h/a) of the average crystallite diameter h in the film thickness direction to the average crystallite diameter a in the in-plane direction is 0.2 or smaller.

For measurement of the crystallite size in the chromium plating film 7, characteristic X-rays Cu-Kα of an X-ray diffraction device are used so that in-plane diffraction lines and wide-angle diffraction lines can be evaluated by a Hall method separately for the crystallite size and distortion.

The average crystallite diameter h in the film thickness direction in the present embodiment indicates a value obtained by the foregoing Hall method using diffraction lines of reflected X-rays which are generated when a range of 10 mm×l 0 mm in a plating film is scanned using a wide-angle X-ray diffraction device.

The average crystallite diameter a in the in-plane direction in the present embodiment indicates a value obtained using diffraction lines of in-plane diffraction X-rays which travel in a direction along a surface of a sample and are generated when a range of 10 mm×10 mm in a plating film is scanned using a high-resolution X-ray diffraction device at an irradiation angle which is extremely smaller than that in a wide-angle X-ray diffraction.

In the chromium plating film 8 having the structure in the related art illustrated in FIG. 5, the aspect ratio (h2/a2) of the average crystallite diameter in the film thickness direction to the average crystallite diameter in the in-plane direction is larger than the aspect ratio (h/a) in the chromium plating film 7 illustrated in FIG. 4. For this reason, the chromium plating film 8 illustrated in a cross section in FIG. 5 contains many crystallites 10 elongated in the film thickness direction. In contrast, the chromium plating film 7 illustrated in a cross section in FIG. 4 contains many crystallites 9 elongated in a surface direction.

Every crystallite 9 shown in FIG. 4 has a quadrangular shape. Every crystallite 10 illustrated in FIG. 5 also has a quadrangular shape. However, when it is assumed that the structure in FIG. 4 and the structure in FIG. 5 have the same overall film thickness, the number of crystallites 9 deposited in the film thickness direction in the structure of the cross section in FIG. 4 is larger than the number of crystallites 10 deposited in the film thickness direction in the structure of the cross section in FIG. 5.

As can be seen in comparison between FIGS. 4 and 5, the foregoing aspect ratio (h/a) in the chromium plating film 7 of the present embodiment is 0.2 or smaller. This means that the average crystallite diameter in the in-plane direction is considerably larger than the average crystallite diameter in the film thickness direction in the crystallites 9 constituting the chromium plating film 7 illustrated in FIG. 7.

Figure 6:
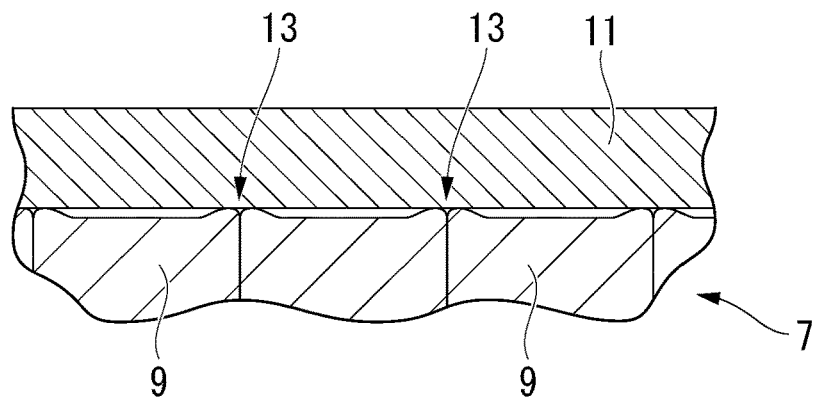
FIG. 6 is an explanatory view illustrating a relationship between grain boundaries in a chromium plating film on a rod surface illustrated in FIG. 1 and an oil seal.
Figure 7:
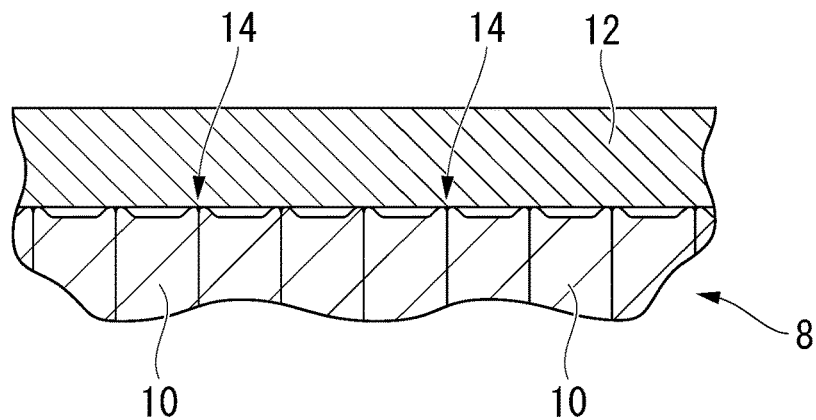
FIG. 7 is an explanatory view illustrating a relationship between grain boundaries in a chromium plating film on a rod surface in the related art and an oil seal.

FIG. 6 is a conceptual diagram illustrating a state in which an oil seal 11 is brought into contact with a rod provided with the chromium plating film 7 illustrated in FIG. 4. FIG. 7 is a conceptual diagram illustrating a state in which an oil seal 12 is brought into contact with a rod including the chromium plating film 8 in the related art illustrated in FIG. 5.

In FIG. 4, boundaries between the crystallites 9 and 9 adjacent to each other in the surface direction of the oil seal 11 can be regarded as grain boundaries 13. In FIG. 5, boundaries between the crystallites 10 and 10 adjacent to each other in the surface direction of the oil seal 12 can be regarded as grain boundaries 14.

For this reason, in comparison between a case in which the chromium plating film 7 illustrated in FIG. 6 slides with respect to the oil seal 11 and a case in which the chromium plating film 8 illustrated in FIG. 7 slides with respect to the oil seal 12, the structure in FIG. 6 has a lower probability that the grain boundaries 13 will abrade the oil seal 11. For this reason, adhesion is unlikely to occur on a surface of the chromium plating film 7, and an effect of improving the sliding characteristics of the rod 1 can be achieved.

In addition, in the chromium plating film 7, as described above, the aspect ratio of the average crystallite diameter in the film thickness direction to the average crystallite diameter in the in-plane direction is 0.2 or smaller. For this reason, the number of grain boundaries 13 present in the sliding direction becomes smaller than that in the chromium plating film in the related art. For this reason, in the chromium plating film 7 of the present embodiment, since the number of times of sliding with respect to the crystal grain boundaries becomes smaller than that in the chromium plating film in the related art, the frictional coefficient decreases, and since the frictional coefficient decreases, the sliding characteristics are improved. For this reason, deformation of crystals in the chromium plating film is unlikely to occur due to condensation. Since the form of wear can be changed to that of sliding friction, the rate of wear can be reduced.

For this reason, in the rod 1 serving as a metal sliding component, a true contact portion with respect to an opponent material is stable during sliding. In addition, since the number of times of sliding at crystal grain boundaries which may generate fine differences in level is reduced, the frictional coefficient can be decreased.

In the chromium plating film 7 of the present embodiment, the (111) planes are preferentially aligned in the in-plane direction. In addition, the aspect ratio described above is sufficiently small. Therefore, the surface state in the in-plane direction is stable, and desired excellent sliding characteristics are obtained. Further, since the crystallite diameters of the crystallites 9 in the film thickness direction can be made small, the chromium plating film 7 can have a sufficiently high hardness (1,000 HV or higher), and the chromium plating film 7 can also have a sufficient wear resistance.

Regarding the rod 1 including the chromium plating film 7 of the present embodiment, an oxide film having chromium oxide as a main constituent may be formed on a surface of the chromium plating film 7 by performing a high-frequency heat treatment after a plating treatment.

[Method for Producing Chromium Plating Film]

The foregoing chromium plating film 7 is formed by performing a plating treatment utilizing a DC constant current in a chromium plating bath containing an organic sulfonic acid. It is preferable that a plating solution be set such that a steady flow in a direction along a plated surface is applied at a predetermined flow speed.

Regarding a chromium plating bath containing an organic sulfonic acid, it is desirable to use a chromium plating bath having the component composition which is described in Japanese Examined Patent Application, Second Publication No. S63-32874 and shown in the following Table 1.

TABLE 1

| Component | Mixed quantity (g/L) | |
| --- | --- | --- |
| | Appropriate range | Preferable range |
| Chromic acid | 100 to 450 | 200 to 300 |
| Sulfuric acid | 1 to 5 | 1.5 to 3.5 |
| Organic sulfonic acid | 1 to 18 | 1.5 to 12 |

First Embodiment of Chromium Plating Film Production Device

Figure 8:
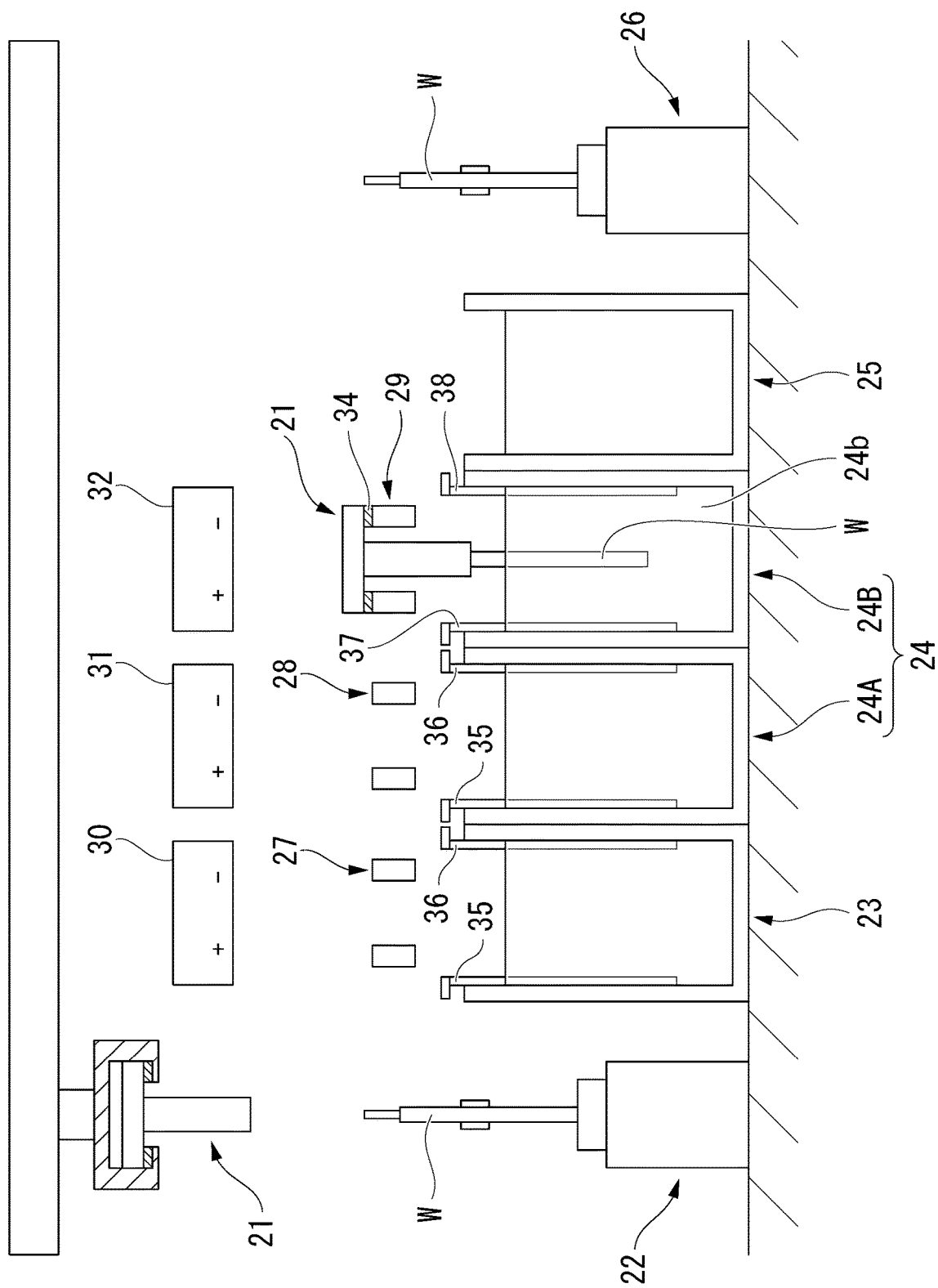
FIG. 8 is an explanatory view illustrating a first production device used for forming a chromium plating film on the rod serving as a metal sliding component according to the embodiment of the present invention.

FIG. 8 illustrates a form of a device for forming the foregoing chromium plating film 7 on a surface of the rod 1. This device has hangers 21 which support workpieces (for example, metal piston rods) W in a suspended state and move. Below a line of movement thereof, a mounting station 22, an alkaline electrolysis degreasing tank 23, a plating tank 24, a washing tank 25, and a separation station 26 are arranged in this order. The plating tank 24 is divided into an etching treatment tank 24A on an alkaline electrolysis degreasing tank 3 side and a plating treatment tank 24B subsequent thereto. A chromium plating bath 24b containing the organic sulfonic acid is accommodated in the plating treatment tank 24B.

In addition, bus bars 27, 28, and 29 are respectively arranged in a divided manner above the alkaline electrolysis degreasing tank 23, the etching treatment tank 24A, and the plating treatment tank 24B. In these bus bars, DC power sources 30, 31, and 32 are respectively connected to the bus bar 27 corresponding to the alkaline electrolysis degreasing tank 23, the bus bar 28 corresponding to the etching treatment tank 24A, and the bus bar 29 corresponding to the plating treatment tank 24B.

On the other hand, power supply brushes 34 provided in the hangers 21 come into sliding contact with the respective bus bars 27, 28, and 29. Accordingly, a current is evenly distributed to each of the hangers 21 from the corresponding power sources 30, 31, and 32. A plurality of negative electrodes 35 and 36 connected in parallel by the unit of each tank are individually arranged inside the alkaline electrolysis degreasing tank 23 and the etching treatment tank 24A. Positive electrodes 37 and 38 connected in parallel by the unit of the bus bar 29 are arranged inside the plating treatment tank 24B. A current is supplied to the negative electrodes 35 and 36 and the positive electrodes 37 and 38 from the corresponding power sources 30, 31, and 32. An amperemeter is interposed between each of the positive electrodes 37 and 38 inside the plating treatment tank 24B and the power source 32.

In order to perform chromium plating using the foregoing production device, first, the workpiece W is mounted in the hanger 21 at the mounting station 22. Next, the workpiece W is sequentially transferred to the alkaline electrolysis degreasing tank 23 and the etching treatment tank 24A in a state of being suspended by the hanger 21.

Further, a degreasing treatment having the workpiece W as a positive electrode in the alkaline electrolysis degreasing tank 23 and an etching treatment having the workpiece W as a positive electrode in the etching treatment tank 24A are individually performed. Subsequently, the workpiece W is transferred to the plating treatment tank 24B. Here, a chromium plating treatment having the workpiece W as a negative electrode is performed.

During the foregoing chromium plating treatment, first, a plating treatment is performed by causing a plating solution to flow in a direction along a surface of the workpiece W and supplying a DC current from the DC power source 32 to the workpiece W via the bus bar 29 and the positive electrode 37. This plating treatment continues while the power supply brush 34 of the hanger 21 supporting the workpiece W in a suspended state is in contact with the bus bar 29, and the chromium plating film 7 is formed. Thereafter, workpiece W is washed in the washing tank 25 and reaches the separation station 26. The workpiece W is removed from the hanger 21 at the separation station 26.

During the plating treatment, a plating treatment is performed by applying a DC current in a state in which a plating solution regularly flows in the direction along a surface of the workpiece W as described above. Here, a temperature of the plating solution on a flowing terminal side of the plating solution (at a liquid level of the workpiece W in the present embodiment) is set to 60° C. or higher so that a glossy chromium plating film is obtained.

Moreover, the outlet temperature of a plating solution is set to 90° C. or lower and is desirably set to 85° C. or lower so that a chromium plating film having a small aspect ratio of crystallites can be formed. In addition, it is preferable to apply a DC current of 350 ASD (A/dm$^2$) or higher. In the present embodiment, since the flatness of the plating film deteriorates and abnormality in properties of the plating film is caused when 1,500 ASD or higher is applied, it is desirable to substantially apply 350 to 1,500 ASD and is more desirable to apply 400 to 1,200 ASD. When a plating treatment is performed at the current density of this range, the current density is in a higher range than a general current density for generating a chromium plating film of this kind. For this reason, a plating treatment performed within the range described above means that high-speed chromium plating is performed.

The present embodiment is characterized by setting a current density higher than the current density in the case of treating a general workpiece of this kind in the related art and applying a flow speed to a plating solution. The plating speed can be increased by performing a treatment at a high current density in this manner. In addition, the flow speed of a plating solution is 0.01 m/s or higher and is preferably 0.05 m/s or higher. When the flow speed of the plating solution is excessively low, the temperature of the plating solution significantly rises due to a high current so that normal chromium plating cannot be performed.

Moreover, when the flow speed becomes 2.5 m/s or higher, temperature rise on a workpiece surface accompanied by a plating current becomes insufficient, and hexavalent chromium reduction intermediates generated during a plating reaction process cannot remain on the workpiece surface. For this reason, continuous progress of precipitation reaction is hindered, and a film having a low crystal orientation grows.

However, a relationship of the upper limit and the lower limit for the flow speed described in the present embodiment greatly depends on the plating equipment. The reason is that the heat capacitance varies due to the size or the like of the equipment and an excessive heat quantity caused by a contact resistance or the like significantly raises the solution temperature. For this reason, preferably, it is desirable to set operating conditions after clarifying the relationship between the outlet temperature of a plating solution and the flow rate.

An effect of being able to shorten a lead time at the time of production and improve the production efficiency is achieved by performing high-speed chromium plating.

Second Embodiment of Chromium Plating Film Production Device

Regarding a second embodiment in a case of forming the chromium plating film 7 in the workpiece W, it is possible to follow the method described below with reference to FIG. 9.

In the second embodiment, a plating treatment device 42 including an inner tube-type positive electrode 40 and an outer tube-type treatment tank main body 41 is used. A rod-shaped workpiece W is installed at the center of the positive electrode 40, and a plating treatment is performed.

When a plating treatment is performed, it is preferable that an upward circulating flow be generated in a plating solution accommodated in the inner tube-type positive electrode 40.

Since the electrodes are disposed in this manner, a flow of a plating solution in the vicinity of the surface of the workpiece W is easily straightened. In addition, rise in plating solution temperature when a high current is applied is easily managed, and thus an appropriate temperature range and an appropriate flow rate range can be stably provided.

Specific Example of Production Device

Figure 9:
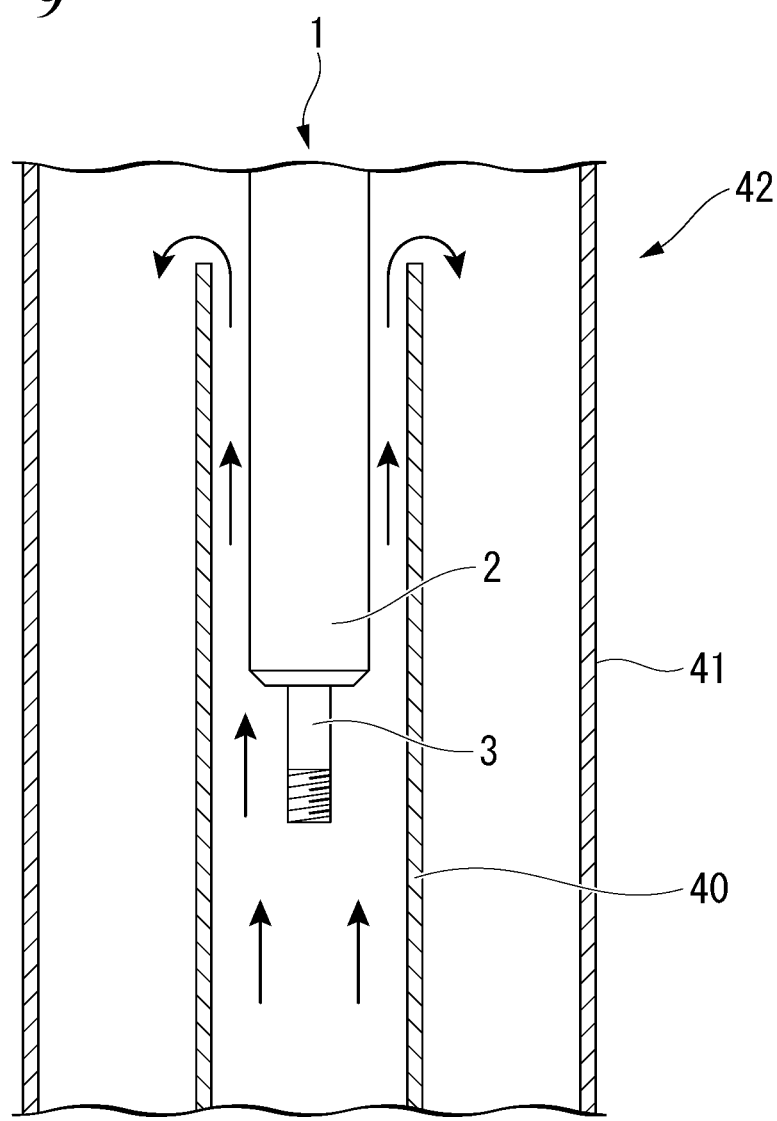
FIG. 9 is an explanatory view illustrating an overview of a second production device used for forming a chromium plating film on the same rod.
Figure 10:
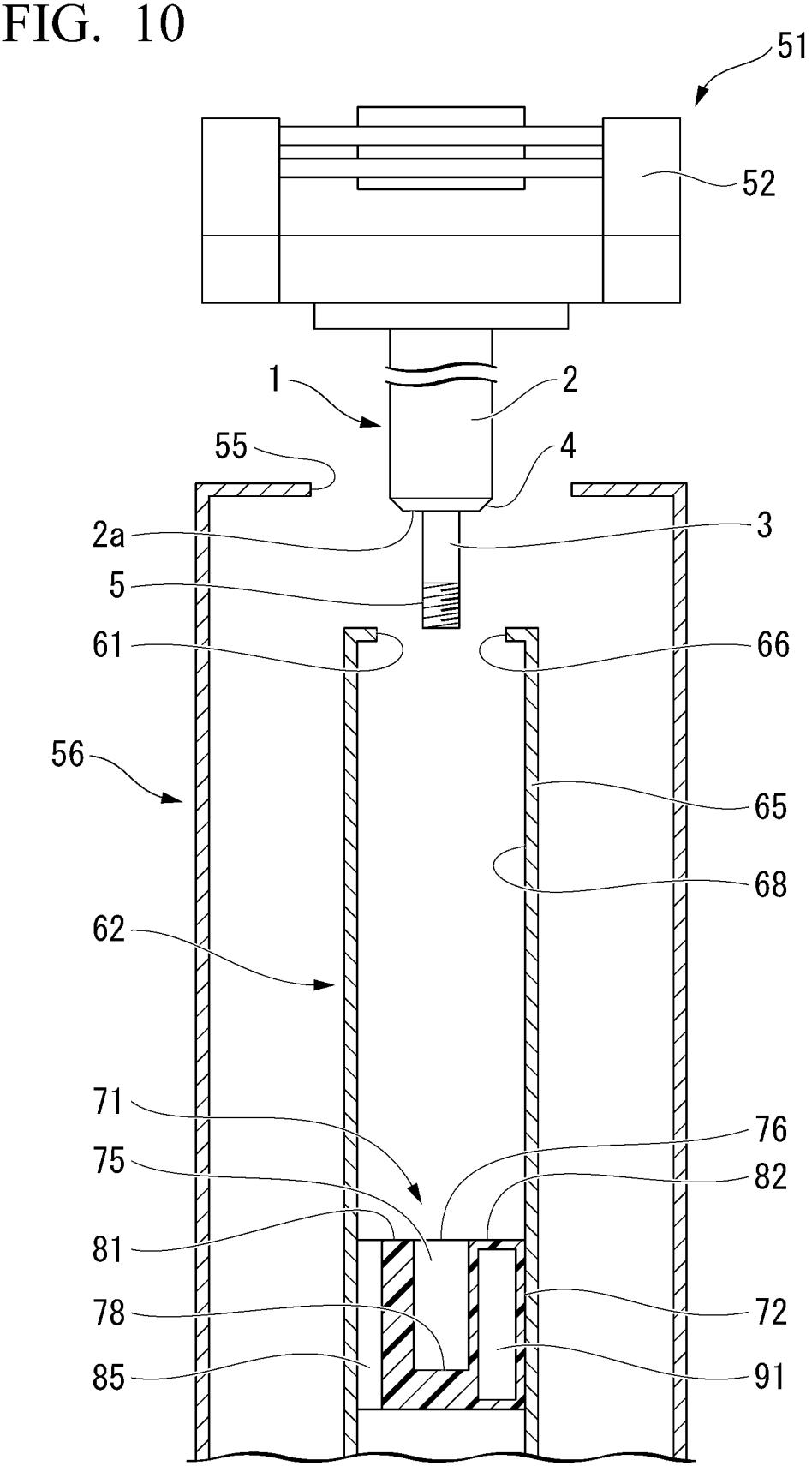
FIG. 10 is a cross-sectional view illustrating a detailed structure of a main part when the same second production device has a concrete structure.

FIG. 10 is a cross-sectional view illustrating an example having a more detailed structure regarding the plating treatment device 42 illustrated in FIG. 9.

A plating treatment device 51 of this example has a gripping portion 52 of a transportation robot. The gripping portion 52 grips the large diameter portion 2 that is a part on a side opposite to the small diameter portion 3 of the rod 1. The gripping portion 52 grips the rod 1 in a state of extending vertically downward from the gripping portion 52. The gripping portion 52 can vertically ascend and descend. The rod 1 in a state of being gripped by the gripping portion 52 extends in a vertical direction, and the small diameter portion 3 is disposed on a side below the large diameter portion 2.

The plating treatment device 51 includes an outer tube-type treatment tank main body 56. The treatment tank main body 56 includes an insertion port 55 allowing entry of the rod 1 which is gripped by the gripping portion 52 and descends together with the gripping portion 52 at the upper portion. In addition, the plating treatment device 51 includes an inner tube-type electrode 62 inside the treatment tank main body 56. The electrode 62 includes an insertion port 61 allowing entry of the rod 1 which is gripped by the gripping portion 52 and descends together with the gripping portion 52 at the upper portion. The insertion port 61 of the electrode 62 is disposed on a side below the insertion port 55 of the treatment tank main body 56.

The electrode 62 has a cylindrical wall electrode portion 65 and an annular member 66 which is fastened on an upper end edge portion side of the wall electrode portion 65 using a fastening member such as a screw (not illustrated). The annular member 66 is constituted such that an outer circumferential side has the same diameter as an outer diameter of the wall electrode portion 65 and an inner circumferential side has a diameter smaller than an inner diameter of the wall electrode portion 65. Namely, the annular member 66 has a part extending to a side inward in a diameter direction from the wall electrode portion 65 on the inner circumferential side. In addition, the annular member 66 is an insulator. This annular member 66 plays a role of a stopper preventing a masking jig 71 (which will be described below) from leaping out from the electrode 62. In order to facilitate detachment when the masking jig 71 is replaced, it is desirable that the annular member 66 be fastened to the wall electrode portion 65 using a fastening member.

The plating treatment device 51 has the masking jig 71 disposed on the inner side of the wall electrode portion 65 of the electrode 62. The masking jig 71 is used for masking the flange portion 2a and the small diameter portion 3 of the rod 1 when the large diameter portion 2 of the rod 1 is subjected to plating. The masking jig 71 is provided such that it can independently move with respect to the electrode 62, can slide on an inner circumferential surface 68 of the wall electrode portion 65, and can vertically ascend and descend.

The masking jig 71 has an outer circumferential surface 72 which comes into sliding contact with the inner circumferential surface 68 of the wall electrode portion 65. In the masking jig 71, an accommodation hole 75 (circular hole) is formed in an axial direction at the center in the diameter direction. The accommodation hole 75 is formed from one end of the masking jig 71 in the axial direction to a halfway position on the other end side. In other words, the accommodation hole 75 is a bottomed hole which has an opening portion 76 at one end of the masking jig 71 in the axial direction and of which the other end side is not open. The accommodation hole 75 has a bottom surface 78. The inner diameter of the accommodation hole 75 is larger than the outer diameter of the small diameter portion 3 of the rod 1 and is smaller than the largest diameter of the flange portion 2a. In addition, the depth of the accommodation hole 75 is larger than the length of the small diameter portion 3 of the rod 1.

The masking jig 71 has an abutment portion 81 expanding outward in the diameter direction of the accommodation hole 75 from the accommodation hole 75, in other words, outward in the diameter direction of the masking jig 71 from the accommodation hole 75 at an end portion of the accommodation hole 75 on the opening portion 76 side. The abutment portion 81 has an annularly flat abutment surface 82 expanding in a manner orthogonal to the axial direction of the masking jig 71. The smallest diameter of the abutment surface 82 is equivalent to the inner diameter of the accommodation hole 75, is smaller than the largest diameter of the flange portion 2a of the rod 1, and is larger than the small diameter portion 3. Thus, in the abutment portion 81, the flange portion 2a of the rod 1 in a state in which the small diameter portion 3 is accommodated in the accommodation hole 75 is capable of abutting the abutment surface 82 thereof. When the small diameter portion 3 is accommodated in the accommodation hole 75 in a coaxial state in which a central axis coincides therewith, the flange portion 2a abuts the abutment surface 82.

A groove-shaped penetration path 85 recessed inward in the diameter direction from the outer circumferential surface 72 is formed in the masking jig 71. The penetration path 85 penetrates the masking jig 71 in the axial direction of the masking jig 71, in other words, from one end side to the other end side in the axial direction of the accommodation hole 75.

The penetration path 85 is a plating solution circulating path through which a plating solution passes through in the axial direction of the masking jig 71.

In the masking jig 71, as illustrated in FIG. 10, a hollow portion 91 is formed in the axial direction of the masking jig 71 at an intermediate position in the axial direction. The hollow portion 91 is disposed on the outer side of the masking jig 71 in the diameter direction from the abutment portion 81. The hollow portion 91 retains and seals air. The hollow portion 91 is a part generating a buoyant force in the masking jig 71.

The masking jig 71 is formed of an insulating synthetic resin material and is an insulator in its entirety. The masking jig 71 is constituted to have a smaller specific weight than a plating solution. For example, the masking jig 71 is formed of polyvinyl chloride, polyvinylidene fluoride, or polytetrafluoroethylene. In the present embodiment, an example in which the entire masking jig 71 is formed of a synthetic resin material has been described. However, a suitable change can be made. For example, an outer circumferential sliding surface or the accommodation hole 75 can be coated with an inorganic material, a metal material, or the like having a sliding resistance.

As illustrated in FIG. 10, the masking jig 71 is disposed inside the wall electrode portion 65 in a state in which the abutment portion 81 and the opening portion 76 of the accommodation hole 75 are directed upward. When the masking jig 71 descends to a position of a lower portion of the wall electrode portion 65 due to its self-weight, it abuts a stopper (not illustrated) and further descending is restricted. A position which is illustrated in FIG. 10 and at which the masking jig 71 abuts the stopper (not illustrated) and stops becomes a lowermost position in an ascending/descending range. A state in which the masking jig 71 is at this lowermost position is a standby state.

When the large diameter portion 2 of the rod 1 is subjected to plating, in the plating treatment device 51, the rod 1 gripped by the gripping portion 52 is inserted into the insertion port 55 of the treatment tank main body 56 from the small diameter portion 3 side and is further inserted into the insertion port 61 of the electrode 62. Further, the gripping portion 52 descends the rod 1 such that the large diameter portion 2 is inserted into the electrode 62 by a predetermined length and stops. In this manner, the rod 1 which is gripped by the gripping portion 52 and stops is disposed coaxially with the electrode 62 and the masking jig 71 and stops on the upper side from the masking jig 71 in a standby state.

In the plating treatment device 51, a plating solution flows upward from below inside the electrode 62 toward the masking jig 71. Consequently, the masking jig 71 has a resistance structure against the plating solution. Since the specific weight is smaller than that of the plating solution, a buoyant force is generated due to a flow of the plating solution, and it ascends.

The masking jig 71 which has ascended due to the plating solution causes the accommodation hole 75 thereof to accommodate the small diameter portion 3 of the rod 1 and causes the abutment portion 81 to abut the flange portion 2a of the rod 1 and to stop. The plating solution flows upward from below through the penetration path 85 and comes into contact with the large diameter portion 2 inside the electrode 62. The plating solution which has overflowed from the insertion port 61 of the electrode 62 flows downward through a part between the treatment tank main body 56 and the electrode 62.

In other words, in the plating treatment device 51, the masking jig 71 is disposed with the abutment portion 81 and the opening portion 76 of the accommodation hole 75 directed upward, and a plating solution is caused to flow upward from below toward the masking jig 71. Therefore, the small diameter portion 3 of the rod 1 is accommodated in the accommodation hole 75 of the masking jig 71, and the abutment portion 81 of the masking jig 71 abuts the flange portion 2a of the rod 1. In addition, the plating solution can flow upward from below in the penetration path 85 of the masking jig 71 and can come into contact with the large diameter portion 2 of the rod 1.

In a state in which a plating solution continuously flows inside the electrode 62 as described above, power is supplied between the rod 1 and a contact point of the electrode 62. Consequently, in the small diameter portion 3 of which the position in the axial direction overlaps and covers the masking jig 71 (insulator), electrodeposition of plating, that is, formation of a plating layer is curbed, the large diameter portion 2 of which the position in the axial direction does not overlap and cover the masking jig 71 is subjected to electrodeposition of plating, and a chromium plating layer is formed.

By reducing a gap between the outer circumferential surface 72 of the masking jig 71 and the inner circumferential surface 68 of the wall electrode portion 65, the masking jig 71 serves as a shielding plate blocking currents to be flowing from the cylindrical surface-shaped inner circumferential surface 68 of the wall electrode portion 65 positioned at the lower portion using the masking jig 71. Therefore, generation of currents to be originally concentrated below the rod 1 is curbed. Accordingly, an effect of making the film thickness uniform is achieved.

When a plating layer having a predetermined thickness is formed in the large diameter portion 2, the plating treatment device 51 stops the plating solution flowing from below toward the masking jig 71 inside the electrode 62. Consequently, the masking jig 71 descends to the lowermost position due to its self-weight, abuts the stopper, and returns to a standby state. Thereafter, the gripping portion 52 illustrated in FIG. 10 ascends to pull up the rod 1 from the electrode 62 and the treatment tank main body 56 and shifts it to a following process, and the gripping portion 52 grips another rod 1 for the next plating treatment.

By generating a flow of a plating solution along the outer circumferential surface of the rod 1 and performing a plating treatment under the DC current applying conditions described above using a plating solution at the temperature described above, the rod 1 including the chromium plating layer 7 desired in the present embodiment in the large diameter portion 2 can be achieved.

In the present embodiment, in the chromium plating film 7, it is desired to cause the aspect ratio of the average crystallite diameter in the film thickness direction to the average crystallite diameter in the in-plane direction to be 0.2 or smaller and form the chromium plating film 7 in which crystals are oriented such that the (111) planes of the crystals of chromium have a preferred azimuth aligned parallel to the in-plane direction. In addition, in this chromium plating film 7, it is preferable that the average diameter of the crystallites be 12 nm or smaller in the film thickness direction and be 60 nm or larger in the in-plane direction.

When this chromium plating film 7 is formed, it is desirable to perform manufacturing using the plating treatment device 51 having the structure illustrated in FIG. 10 in order to obtain a chromium plating film having an excellent crystal orientation and a desired average crystallite diameter.

[Cylinder Device]

Figure 11:
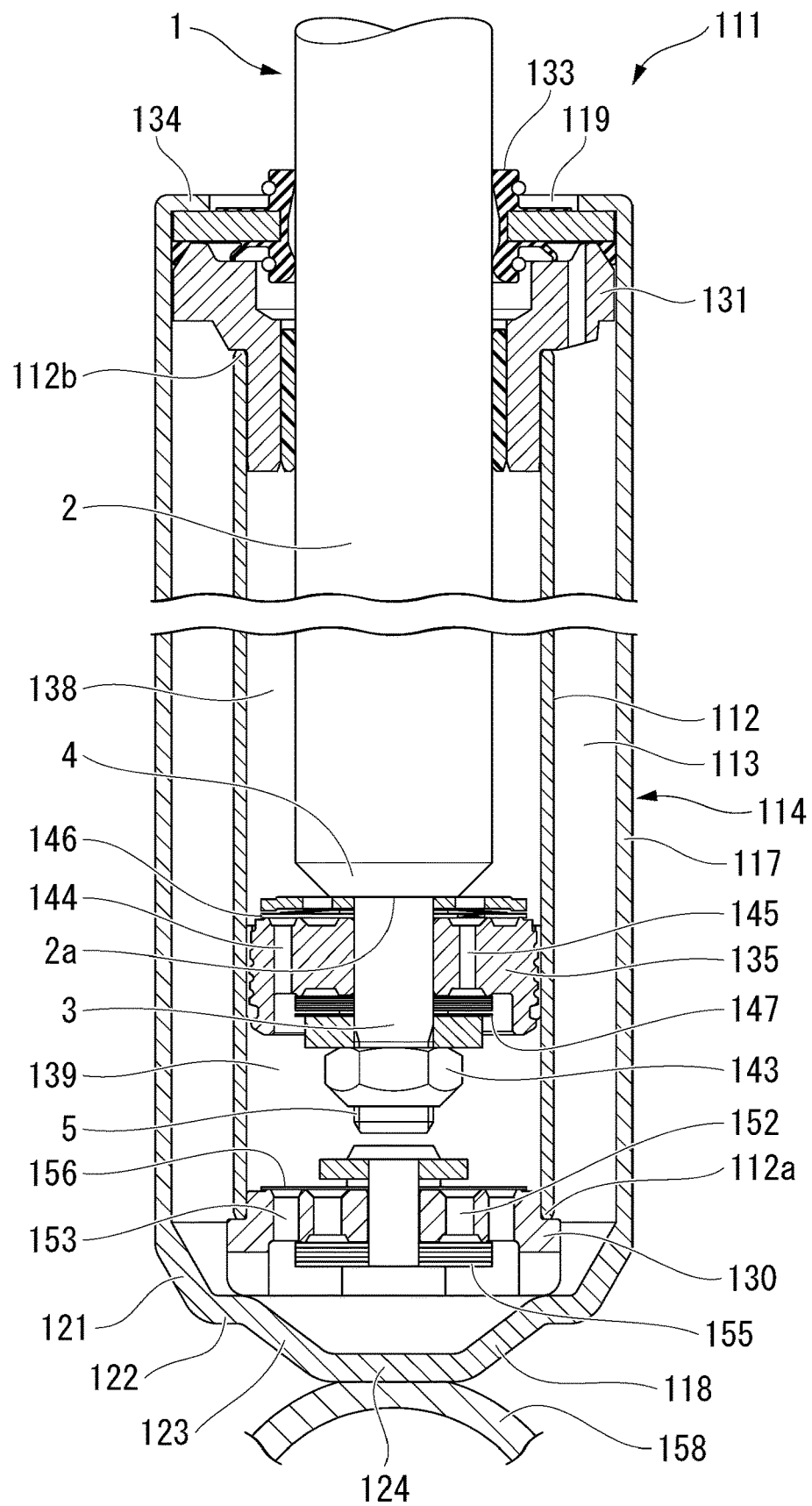
FIG. 11 is a cross-sectional view illustrating an example of a cylinder device including the rod illustrated in FIG. 1.

FIG. 11 is a cross-sectional view illustrating a first embodiment of a cylinder device according to the present invention including the rod 1 having the chromium plating film 7 described above.

A cylinder device 111 illustrated in FIG. 11 is a shock absorber used in a suspension device of a vehicle such as an automobile or a railway vehicle. Specifically, it is a shock absorber used in a strut-type suspension of an automobile. The cylinder device 111 has a cylindrical inner tube (cylinder) 112 and a bottomed tube-shaped outer tube 114. A working fluid is sealed in the inner tube 112. The outer tube 114 has a larger diameter than the inner tube 112 and is provided on the outer circumferential side of the inner tube 112. A reservoir chamber 113 in which a working fluid and a working gas are sealed is formed between the outer tube 114 and the inner tube 112. Namely, the cylinder device 111 is a multi-cylinder shock absorber in which the inner tube 112 is provided inside the outer tube 114.

The outer tube 114 is an integrated molded article constituted of one metal member. The outer tube 114 has a cylindrical side wall portion 117, a bottom portion 118 closing one end side of the side wall portion 117 in the axial direction, and an opening portion 119 on a side opposite to the bottom portion 118 of the side wall portion 117. The central axes of the side wall portion 117 and the bottom portion 118 become the central axis of the outer tube 114.

The bottom portion 118 has a tapered tube-shaped portion 121, a flat plate-shaped toric portion 122, a tapered tube-shaped portion 123, and a flat plate-shaped circular plate portion 124. The tapered tube-shaped portion 121 extends from an end edge portion of the side wall portion 117 in the axial direction such that the diameter decreases as it is separated from the side wall portion 117. The toric portion 122 extends inward in the diameter direction from an end edge portion of the tapered tube-shaped portion 121 on a side opposite to the side wall portion 117. The tapered tube-shaped portion 123 extends from an end edge portion of the toric portion 122 on a side opposite to the tapered tube-shaped portion 121 such that the diameter decreases as it is separated from the toric portion 122. The circular plate portion 124 extends inward in the diameter direction from an end edge portion of the tapered tube-shaped portion 123 on a side opposite to the toric portion 122. The tapered tube-shaped portions 121 and 123 have tapered shapes centering on the central axis of the outer tube 114. The toric portion 122 and the circular plate portion 124 expand in a manner orthogonal to the central axis of the outer tube 114.

The inner tube (cylinder) 112 is an integrated molded article constituted of one metal member. The inner tube 112 has a cylindrical shape. The inner tube 112 is engaged with the bottom portion 118 of the outer tube 114 via a toric base member 130 attached to an opening portion 112a on one end side thereof in the axial direction. The inner tube 12 is engaged with a side opposite to the bottom portion 118 of the side wall portion 117 of the outer tube 114 via a toric rod guide 131 attached to an opening portion 112b on the other end side thereof in the axial direction.

The base member 130 is placed at the bottom portion 118 of the outer tube 114 in a state of being fitted and fixed to the inner tube 112. The base member 130 is placed at the toric portion 122 of the bottom portion 118. At this time, it is subjected to positioning in the diameter direction by the tapered tube-shaped portion 121. Accordingly, the base member 130 is disposed coaxially with the outer tube 114. As a result, one end portion of the inner tube 112 in the axial direction is disposed coaxially with the outer tube 114.

The rod guide 131 is fitted to the inner tube 112 and the side wall portion 117 of the outer tube 114 so that the other end portion of the inner tube 112 in the axial direction is disposed coaxially with the outer tube 114. A toric seal member (sliding contact member) 133 is disposed on a side opposite to the bottom portion 118 with respect to this rod guide 131. This seal member 133 is also fitted to an inner circumferential portion of the side wall portion 117. A swaged portion 134 which is plastically deformed inward in the diameter direction by curling is formed on the opening portion 119 side opposite to the bottom portion 118 of the side wall portion 117. The seal member 133 is sandwiched between this swaged portion 134 and the rod guide 131. The outer side of the seal member 133 in the axial direction is interlocked by this swaged portion 134, thereby sealing the opening portion 119 side of the outer tube 114.

A piston 135 is fitted inside the inner tube 112 in a slidable manner. This piston 135 defines a first chamber 138 and a second chamber 139 inside the inner tube 112. The first chamber 138 is provided between the piston 135 inside the inner tube 112 and the rod guide 131. The second chamber 139 is provided between the piston 135 inside the inner tube 112 and the base member 130. The second chamber 139 inside the inner tube 112 is defined from the reservoir chamber 113 by the base member 130 provided on one end side of the inner tube 112. The first chamber 138 and the second chamber 139 are filled with oil (working fluid). The reservoir chamber 113 is filled with gas (working gas) and oil (working fluid).

The rod 1 penetrating the center of the piston 135 at the small diameter portion 3 is coupled to the piston 135 using a nut 143. The piston 135 is fitted to the outer circumferential surface of the small diameter portion 3 and abuts the flange portion 2a. The nut 143 is screwed to the male screw portion 5 of the small diameter portion 3.

The rod 1 extends to the outside from the inner tube 112 and the outer tube 114 through the rod guide 131 and the seal member 133 on the outer circumferential surface of the large diameter portion 2. Accordingly, in the rod 1, one end side is disposed inside the outer tube 114 and the inner tube 112 and the other end side is disposed outside the outer tube 114 and the inner tube 112. In the rod 1, the outer circumferential surface of the large diameter portion 2 comes into sliding contact with the rod guide 131, is guided by the rod guide 131, and moves integrally with the piston 135 in the axial direction with respect to the inner tube 112 and the outer tube 114. In the rod 1, the outer circumferential surface of the large diameter portion 2 comes into sliding contact with the seal member 133. The seal member 133 closes the space between the outer tube 114 and the rod 1 and restricts leakage of the working fluid inside the inner tube 112 and the working gas and the working fluid inside the reservoir chamber 113 to the outside.

A path 144 and a path 145 penetrating the piston 135 in the axial direction are formed therein. The paths 144 and 145 allow the first chamber 138 and the second chamber 139 to communicate with each other. A toric disk valve 146 capable of closing the path 144 by abutting the piston 135 is provided in the piston 135 on a side opposite to the bottom portion 118 in the axial direction. In addition, a tonic disk valve 147 capable of closing the path 145 by abutting the piston 135 is provided in the piston 135 on the bottom portion 18 side in the axial direction.

The disk valve 146 opens the path 144 when the rod 1 moves to a contraction side where the amount of entry to the insides of the inner tube 112 and the outer tube 114 increases and the piston 135 moves in a direction in which the second chamber 139 is reduced so that the pressure in the second chamber 139 becomes higher than the pressure in the first chamber 138 by a predetermined value or higher. The disk valve 146 is a damping valve generating a damping force when the path 144 is opened. The disk valve 147 opens the path 145 when the rod 1 moves to an extension side where the amount of protrusion from the inner tube 112 and the outer tube 114 increases and the piston 135 moves in a direction in which the first chamber 138 is reduced so that the pressure in the first chamber 138 becomes higher than the pressure in the second chamber 139 by a predetermined value or higher. The disk valve 147 is a damping valve generating a damping force when the path 145 is opened.

A path 152 and a path 153 penetrating the base member 130 in the axial direction are formed therein. The paths 152 and 153 allow the second chamber 139 and the reservoir chamber 113 to communicate with each other.

In the base member 130, a toric disk valve 155 is disposed on the bottom portion 118 side thereof in the axial direction, and a toric disk valve 156 is disposed on a side opposite to the bottom portion 118 thereof in the axial direction. The disk valve 155 is capable of closing the path 152 by abutting the base member 130. The disk valve 156 is capable of closing the path 153 by abutting the base member 130.

The disk valve 155 opens the path 152 when the rod 1 moves to the contraction side so that the pressure in the second chamber 139 becomes higher than the pressure in the reservoir chamber 113 by a predetermined value or higher. The disk valve 155 is a damping valve generating a damping force when the path 152 is opened. The disk valve 156 opens the path 153 when the rod 1 moves to the extension side and the piston 135 moves to the first chamber 138 side so that the pressure in the second chamber 139 falls below the pressure in the reservoir chamber 113. The disk valve 156 is a suction valve causing a working fluid to flow into the second chamber 139 from the reservoir chamber 113 without substantially generating a damping force when the path 153 is opened.

A cylindrical attachment eye 158 is fixed to the outer side of the circular plate portion 124 by welding in the bottom portion 118 of the outer tube 114. For example, the cylinder device 111 generates a damping force with respect to movement of wheels with respect to a vehicle body while the rod 1 is coupled to the vehicle body side of a vehicle and the attachment eye 158 is coupled to the wheel side of the vehicle. In the cylinder device 111, the rod 1 and the outer tube 114 receive an impulsive force from the outside.

When the vehicle travels, the rod 1 or the outer tube 114 repeatedly receives an impact from the outside in the cylinder device 111. Every time an impulsive force is received, the rod 1 moves to the contraction side or to the opposite side, and a damping force acts at this time. Therefore, the cylinder device 111 exhibits a function as a shock absorber used in a strut suspension of an automobile.

In addition, since the chromium plating film 7 is provided on the outer circumferential surface of the large diameter portion 2 of the rod 1, even if the large diameter portion 2 repeatedly slides with respect to the seal member 133, the chromium plating film 7 exhibits excellent sliding characteristics and exhibits an excellent wear resistance.

In the chromium plating film 7, as described above, since the aspect ratio of the average crystallite diameter in the film thickness direction to the average crystallite diameter in the in-plane direction is 0.2 or smaller, the number of grain boundaries present in the sliding direction becomes smaller than that in the chromium plating film in the related art. For this reason, in the chromium plating film 7 of the present embodiment, since the number of times of sliding with respect to the crystal grain boundaries becomes smaller than that in the chromium plating film in the related art, the frictional coefficient decreases, and since the frictional coefficient decreases, the sliding characteristics are improved. For this reason, deformation of crystals in the chromium plating film is unlikely to occur due to condensation. Since the form of wear can be changed to that of sliding friction, the rate of wear can be reduced. Therefore, durability of the cylinder device 111 is improved, and thus the cylinder device 111 having a long life-span can be provided.

Incidentally, in the embodiment described above, an example in which the chromium plating film of the present embodiment is applied to the rod 1 has been described, but an object to which the chromium plating film of the present embodiment can be applied is not limited to a rod. It can be widely applied to various mechanical components such as various automobile components requiring a wear resistance, mechanical structure members, shafts or rolls for hydraulic equipment, sliding portions such as bearings, pistons, or cylinders, and a high-strength surface treatment for dies, precision roll, and the like.

Examples

With steel rods (a diameter of 12.5 mm and a length of 200 mm) conforming to JIS S25C as sample materials, a plating bath having a component composition including a chromic acid of 250 g/L, a sulfuric acid of 2.5 g/L, an organic sulfonic acid of 8 g/L, and a boric acid of 10 g/L was used as a chromium plating bath. A plating treatment was performed under conditions of a bath temperature of 60° C. and a current density I=500 A/dm$^2$, and a chromium plating film (refer to FIG. 2) having a thickness of approximately 20 μm was formed on the surface of the sample material.

A plating treatment was performed with respect to the steel rod by causing a plating solution to flow in a direction along the surface (an upward direction along the outer circumferential surface of the large diameter portion 2) as illustrated in FIG. 9 using the plating treatment device 51 illustrated in FIG. 10.

The samples were made at flow speeds of 0, 0.05, 0.1, 1.0, 2.5, and 3.0 m/s for the plating solution at the time of performing plating.

In addition, for reference, a sample 1 in which a chromium plating film having a thickness of approximately 20 μm was formed on the surface of the sample material was obtained using the same sample material and the same plating bath and performing a general-purpose hard chromium plating treatment under constant conditions of the bath temperature of 60° C. and the current density of 100 A/dm$^2$. The flow speed of the plating solution at the time of performing plating was set to 1.0 m/s.

For the samples subjected to a plating treatment at various flow speeds of the plating solution, the precipitation film thickness and the glossy were evaluated. In the plating film which was treated at a flow speed within a range of 0.05 m/s to 2.5 m/s, a glossy chromium plating film of approximately 20 μm was obtained. However, uneven precipitation occurred in the case of 0 m/s and a matt plating film was made in the case of 3.0 m/s, which are inappropriate plating films. Next, for the samples obtained when all the flow speeds of the plating solution were set to 1.0 m/s and the current densities were set to 100 A/dm$^2$ and 500 A/dm$^2$, the surface hardness (HV) was measured and the crystallite size (nm) was measured by the method which will be described below, and these are shown in the following Table 2.

In addition, a salt spray test conforming to JIS Z2371 was performed and the presence or absence of rusting was observed.

Here, the residual stress of the chromium plating film was measured using "the X-ray stress measurement method" disclosed in "non-destructive inspection", Vol 37, No. 8, pp. 636 to 642, edited by Japan Non-destructive Inspection Association.

In addition, for measurement of the crystallite sizes in the chromium plating film, characteristic X-rays Cu-Kα of an X-ray diffraction device were used, and in-plane diffraction lines and wide-angle diffraction lines were evaluated by the Hall method for the crystallite sizes.

TABLE 2

| Sample | Measurement method | Crystallite diameter nm | Aspect ratio | Hardness HV | Frictional coefficient |
| --- | --- | --- | --- | --- | --- |
| 100 A/dm$^2$ | Wide-angle | 9 | 0.251 | 1,045 | 0.0487 |
| | In-plane | 35.8 | | | |
| 500 A/dm$^2$ | Wide-angle | 5.5 | 0.065 | 1,233 | 0.0286 |
| | In-plane | 85 | | | |

When a plating treatment was performed by a method in which a high current density and a flow speed were applied, the average crystallite size (average crystallite diameter: a) in the in-plane direction became large, the average crystallite size (average crystallite diameter: h) in the film thickness direction became small, and the reduction of aspect ratio (h/a) was confirmed.

As a result of evaluating the frictional coefficient of the obtained chromium plating film with respect to nitrile butadiene rubber (assuming a sliding member) by a reciprocating sliding test, it was confirmed that the frictional coefficient decreases in the chromium plating film obtained by performing electro-plating at 500 ASD (500 A/dm$^2$). In this chromium plating film, it was ascertained that the hardness (HV) was also improved, the frictional coefficient was small, and thus the wear resistance was also improved.

In addition, in these samples, rusting was not confirmed until the time after 168 hours from the plating treatment in the salt spray test. In the chromium plating film subjected to electro-plating at a high current density (500 A/dm$^2$), rusting was not confirmed until the time after 300 hours.

Next, a sample #1 of a Comparative Example subjected to a chromium electro-plating treatment at a general current density shown in the following Table 3, and a sample #2 of an Example treated at the high current density according to the present invention were prepared. In these samples, results obtained by identifying the crystal structure of the chromium plating film formed on a steel base material by electro-plating using an X-ray diffraction method are shown in the following Table 3.

The crystal orientation of the chromium plating film was quantitatively obtained from the peak area ratio regarding the strong (222) peaks indicating that the (111) planes are preferentially orientated and (200) peaks of the (100) planes by a wide-angle X-ray diffraction method.

TABLE 3

| | Current density | Peak area ratio | |
|---|---|---|---|
| | A/dm$^2$ | (222) | (200) |
| #1 | 100 | 95.7 | 3.4 |
| #2 | 500 | 99.2 | 0.7 |

As is evident from the results shown in Table 3, results showing that the orientation in the chromium plating film of the sample #1 of the Comparative Example was (111) 95.7% and (200) 3.4% were obtained. In contrast, the chromium plating film according to the Example of the present invention indicated orientations of (111) 99.2% and (200) 0.7%.

From the results, in the case of the chromium plating film according to the Example of the present invention in which a chromium plating film was formed at a high current density, it was evident that the orientation of the (111) planes was improved.

Figure 12:
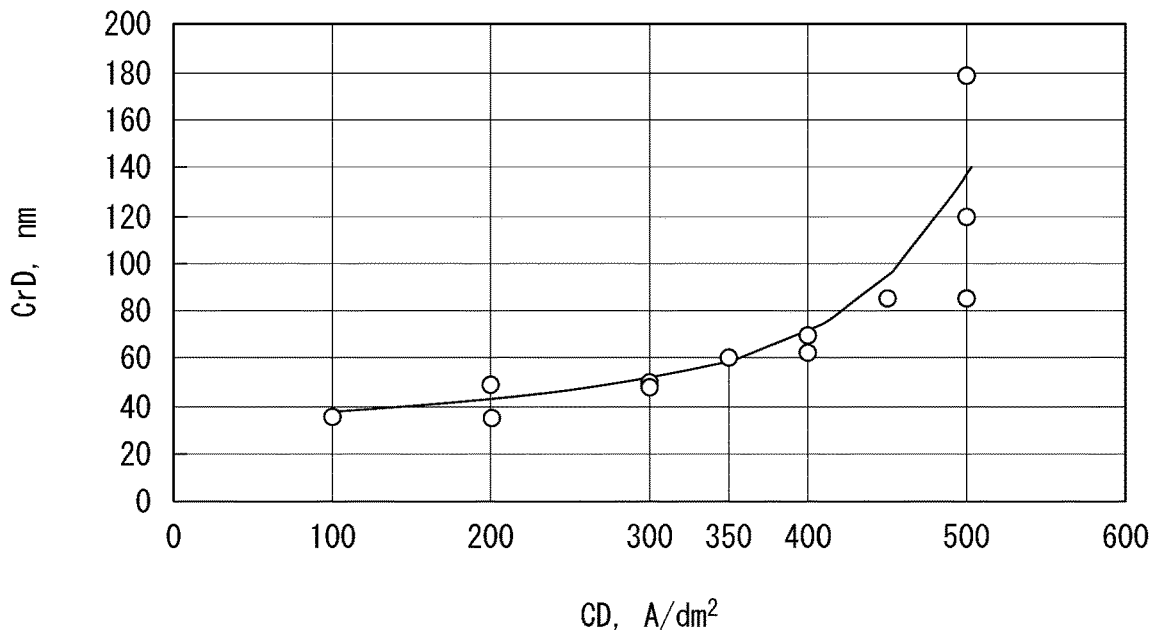
FIG. 12 is a graph showing a correlation between a current density and crystallite diameters in a formed chromium plating film in an in-plane direction when the chromium plating film is formed on a rod surface in an Example.

FIG. 12 illustrates obtained results of the average crystallite diameter (nm) in the in-plane direction of the obtained chromium plating film when a chromium plating film having a thickness of approximately 20 μm was formed on the surface of the sample material of the steel rod by performing a plating treatment under conditions of the bath temperature of 60° C. and the current density I=100 to 500 A/dm$^2$ using a plating bath having a component composition including a chromic acid of 250 g/L, a sulfuric acid of 2.5 g/L, an organic sulfonic acid of 8 g/L, and a boric acid of 10 g/L as a chromium plating bath. In FIG. 12, the vertical axis indicates the crystallite diameters (CrD) (nm), and the horizontal axis indicates the current density (CD) (A/dm$^2$). Regarding the applied current densities, the current densities of 100, 200, 300, 350, 400, 450, and 500 A/dm$^2$ were respectively used.

From the results illustrated in FIG. 12, it has become evident that the crystallite diameters of the in-plane direction could be 60 nm or larger when the current density was set to 350 A/dm$^2$ or higher.

Figure 13:
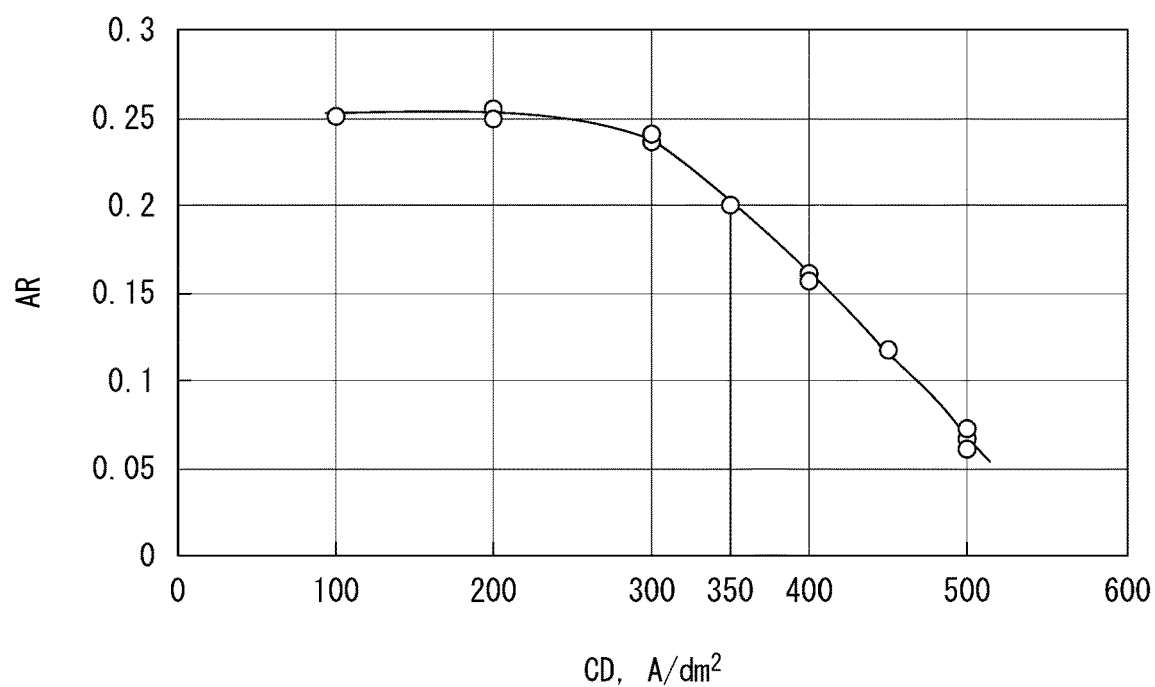
FIG. 13 is a graph showing a correlation between a current density and an aspect ratio of crystallites in a formed chromium plating film when the chromium plating film is formed on the rod surface in the Example.

FIG. 13 illustrates obtained results of the aspect ratio of the average crystallite diameter in the film thickness direction to the average crystallite diameter in the in-plane direction in each of the obtained chromium plating films by performing a plating treatment under conditions of the current density I=100 to 500 A/dm$^2$ using a plating bath equivalent to the plating bath used in the example illustrated in FIG. 12. In FIG. 13, the vertical axis indicates the aspect ratio (AR), and the horizontal axis indicates the current density (CD) (A/dm$^2$).

The applied current densities were respectively set to values of 100, 200, 300, 350, 400, 450, and 500 A/dm$^2$, and results of obtained correlations with respect to the values of the aspect ratio in the obtained chromium plating film are illustrated in FIG. 13.

From the results illustrated in FIG. 13, it is ascertained that there is a need to perform a plating treatment at the current density of 350 A/dm$^2$ or higher in order to have the aspect ratio of 0.2 or smaller.

Figure 14:
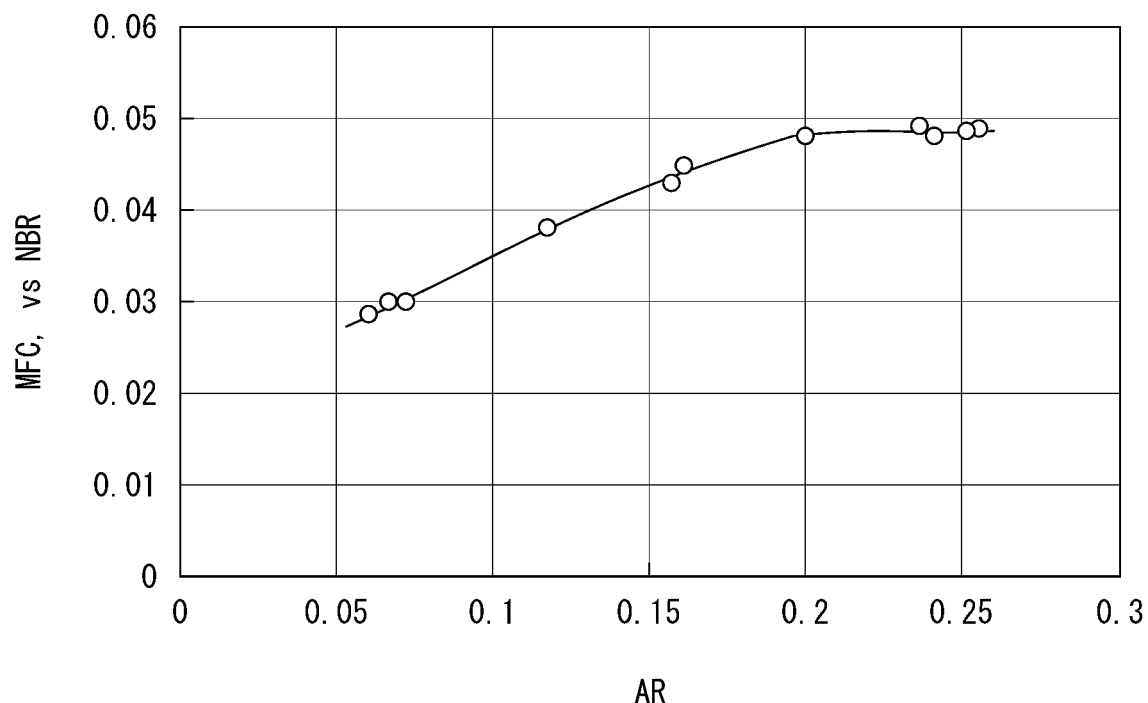
FIG. 14 is a graph related to a chromium plating film formed on the rod surface in the Example and identifying a correlation between an aspect ratio of crystallites of the chromium plating film and a maximum frictional coefficient of the chromium plating film.

FIG. 14 illustrates obtained results of correlations between the aspect ratio (AR) of each of the obtained chromium plating films and the maximum frictional coefficient (MFC) (vsNBR: nitrile butadiene rubber) by performing a plating treatment under conditions of the current density I=100 to 500 A/dm$^2$ using a plating bath equivalent to the plating bath used in the example illustrated in FIG. 12.

From the results illustrated in FIG. 14, it is ascertained that the maximum frictional coefficient also decreases when the aspect ratio decreases within a range of 0.2 or smaller.

In consideration of the results illustrated in FIGS. 12 to 14, in the chromium plating film according to the Example of the present invention, when the aspect ratio of the average crystallite diameter in the film thickness direction to the average crystallite diameter in the in-plane direction becomes 0.2 or smaller, the maximum frictional coefficient decreases. For this reason, it is ascertained that it is preferable to set the aspect ratio to 0.2 or smaller in order to obtain a chromium plating film having an excellent wear resistance.

In addition, it is ascertained that it is desirable to set the current density to 350 A/dm$^2$ or higher for manufacturing a chromium plating film having an aspect ratio of 0.2 or smaller when a chromium plating film is manufactured, and a chromium plating film having crystallite diameters of 60 nm or larger in the in-plane direction can be manufactured by setting the current density to 350 A/dm$^2$ or higher.

INDUSTRIAL APPLICABILITY

According to the foregoing cylinder device, there is an effect of being able to reduce the aspect ratio of crystal structures constituting a chromium plating film, and thus the frictional coefficient can be reduced. Moreover, hardness can also be improved. For this reason, it is possible to provide a cylinder device including a metal sliding component that has a chromium plating film with improved sliding characteristics. Since the aspect ratio is reduced to 0.2 or smaller, a true contact portion with respect to an opponent material is stable during sliding. In addition, the number of times of sliding at crystal grain boundaries which may generate fine differences in level can be reduced, and the frictional coefficient of the chromium plating film can be decreased.

In addition, according to the cylinder device including a rod serving as such a metal sliding component, it is possible to provide a cylinder device in which sliding characteristics of a rod can be improved and which has excellent durability.

REFERENCE SIGNS LIST

1 Rod
2 Large diameter portion

3 Small diameter portion
4 Tapered surface
6 Metal base material
7 Chromium plating film
9 Crystallite
14 Grain boundary
W Workpiece (piston rod)
21 Hanger
22 Mounting station
23 Alkaline electrolysis degreasing tank
24 Plating layer
24A Etching treatment tank
24B Plating tank
25 Washing tank
26 Separation station
27, 28, 29 Bus bar
30, 31, 32 Power source
34 Power supply brush
37, 38 Positive electrode
40 Positive electrode
41 Treatment tank main body
42 Plating treatment device
51 Plating treatment device
56 Treatment tank main body
62 Electrode
71 Masking jig
111 Cylinder device
112 Inner tube (cylinder)
112b Opening portion
131 Rod guide
133 Seal member (sliding contact member)

The invention claimed is:

1. A cylinder device comprising:
a tubular cylinder that has an opening portion on at least one end side;
a metal rod that protrudes through the opening portion of the cylinder; and
a sliding contact member that is provided at the opening portion of the cylinder and comes into sliding contact with the rod,
wherein a chromium plating film is provided on a surface of the rod, and
wherein an aspect ratio of an average crystallite diameter in a film thickness direction to an average crystallite diameter in an in-plane direction in the chromium plating film is 0.2 or smaller.

2. The cylinder device according to claim 1, wherein the average crystallite diameter of the crystallites in the in-plane direction is 60 nm or larger.

3. The cylinder device according to claim 1, wherein the crystallites have a crystal orientation which becomes a preferred azimuth in which (111) planes are aligned in the in-plane direction.

4. A metal sliding component comprising:
a chromium plating film on a surface of a metal base material,
wherein an aspect ratio of an average crystallite diameter in a film thickness direction to an average crystallite diameter in an in-plane direction of crystallites in the chromium plating film is 0.2 or smaller.

5. The metal sliding component according to claim 4, wherein the average crystallite diameter of the crystallites in the in-plane direction is 60 nm or larger.

6. The metal sliding component according to claim 4, wherein the crystallites have a crystal orientation which becomes a preferred azimuth in which (111) planes are aligned in the in-plane direction.

7. The metal sliding component according claim 4, wherein the metal base material is a rod.

8. A method for producing a metal sliding component comprising:
a step of forming a chromium plating film in which an aspect ratio of an average crystallite diameter in a film thickness direction to an average crystallite diameter in an in-plane direction of crystallites is 0.2 or smaller,
wherein the step of forming a chromium plating film comprises a step of immersing a metal base material in a plating solution having a temperature of 60° C. or higher on a flowing terminal side and an outlet temperature of 90° C. or lower, and
a step of applying a current to the plating solution.

9. The method for producing a metal sliding component according to claim 8,
wherein the step of applying a current includes a step of applying a current density becomes 350 ASD or higher when the metal base material is immersed in the plating solution and a current is applied thereto.

10. The method for producing a metal sliding component according to claim 8,
wherein a plating film is formed using a plating solution containing 99 mass % or more of chromium as the plating solution.

11. The method for producing a metal sliding component according to claim 8,
wherein a plating solution containing an organic sulfonic acid is used as the plating solution.

12. The method for producing a metal sliding component according to claim 8,
wherein the average crystallite diameter of the crystallites in the in-plane direction is caused to be 60 nm or larger.

13. The method for producing a metal sliding component according to claim 8,
wherein the crystallites have a crystal orientation which becomes a preferred azimuth in which (111) planes are aligned in the in-plane direction.

* * * * *